(12) United States Patent
Strutt et al.

(10) Patent No.: US 7,609,670 B2
(45) Date of Patent: Oct. 27, 2009

(54) SYSTEM AND METHOD FOR PERFORMING LOW-OVERHEAD, HIGH SPATIAL REUSE MEDIUM ACCESS CONTROL IN A WIRELESS NETWORK

(75) Inventors: Guenael J. Strutt, Sanford, FL (US); Avinash Joshi, Orlando, FL (US)

(73) Assignee: MestNetworks, Inc., Maitland, FL (US)

( * ) Notice: Subject to any disclaimer, the term of this patent is extended or adjusted under 35 U.S.C. 154(b) by 930 days.

(21) Appl. No.: 11/238,573

(22) Filed: Sep. 29, 2005

(65) Prior Publication Data

US 2006/0072530 A1    Apr. 6, 2006

Related U.S. Application Data

(60) Provisional application No. 60/614,447, filed on Sep. 29, 2004.

(51) Int. Cl.
*H04W 4/00*    (2009.01)
(52) U.S. Cl. ..................................... 370/328
(58) Field of Classification Search ......... 370/231–234, 370/252–253, 328–329, 335–338, 342–349, 370/395.21; 455/450–454, 422.1–426.2
See application file for complete search history.

(56) References Cited

U.S. PATENT DOCUMENTS

| | | | |
|---|---|---|---|
| 6,975,599 B1 * | 12/2005 | Johnson et al. | 370/278 |
| 7,061,976 B1 * | 6/2006 | Petranovich | 375/233 |
| 7,447,232 B2 * | 11/2008 | Stephens et al. | 370/471 |
| 2007/0060132 A1 * | 3/2007 | Wilhelmsson et al. | 455/445 |

* cited by examiner

*Primary Examiner*—Thai D Hoang
(74) *Attorney, Agent, or Firm*—Randi L. Karpinia

(57) ABSTRACT

A system and method for avoiding collisions between packets transmitted in a wireless network (100). A first node (102, 106 or 107) in the wireless network (100) can transmit a packet to a second node (102, 106 or 107) in the wireless network (100), such that packet includes a header that is transmitted with a higher processing gain than the data, therefore, may be received and processed by a third node (102, 106 or 107. This allows the third node (102, 106 or 107) to detect the transmission of a packet by the first node (102, 106 or 107), which can cause the third node (102, 106 or 107) to avoid transmission of a packet during the transmission by the first node (102, 106 or 107) to avoid collision between the packets. The system and method further enables the nodes (102, 106 or 107) to determine whether they can transmit to another node (102, 106 or 107) based on estimates of interference conditions that can be experienced due to the presence of other nodes (102, 106 or 107).

16 Claims, 8 Drawing Sheets

SYSTEM AND METHOD FOR PERFORMING LOW-OVERHEAD, HIGH SPATIAL REUSE MEDIUM ACCESS CONTROL IN A WIRELESS NETWORK

This application claims the benefit of U.S. Provisional Application No. 60/614,447, filed Sep. 29, 2004, the entire content being incorporated herein by reference.

FIELD OF THE INVENTION

The present invention relates generally to wireless communication networks, and more particularly, to a system and method for performing medium access control in a wireless network to avoid packet collisions.

BACKGROUND

In recent years, a type of wireless communications network known as an "ad-hoc" network has been developed. In this type of network, each node is capable of operating as a base station or router for the other nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks," filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel," filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System," filed on Mar. 22, 2001, now U.S. Pat. No. 6,873,839, the entire content of each being incorporated herein by reference.

In such networks, it is important to ensure that the appropriate medium access control is performed to avoid packet collisions.

BRIEF DESCRIPTION OF THE FIGURES

These and other objects, advantages and novel features of the invention will be more readily appreciated from the following detailed description when read in conjunction with the accompanying drawings, in which.

Figure 1:
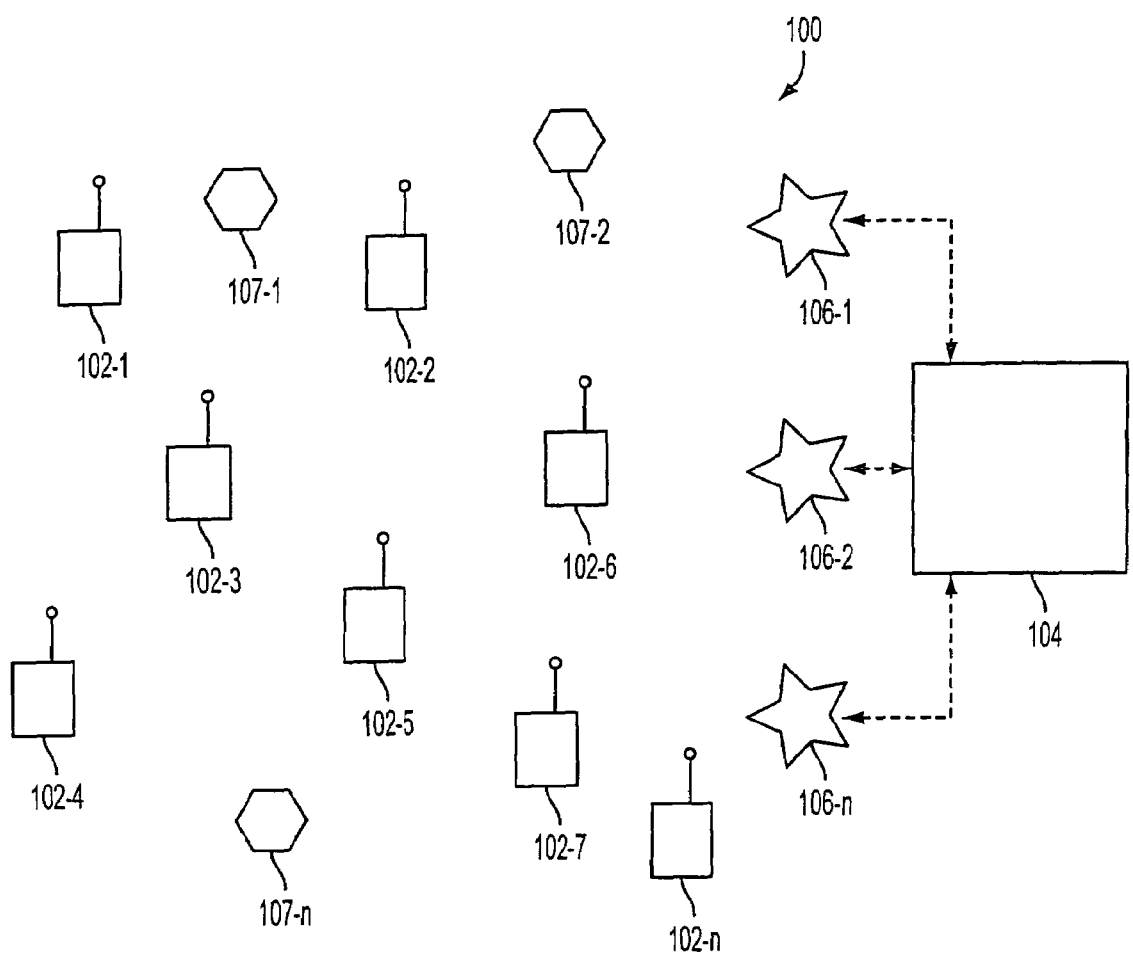
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components for performing medium access control in a wireless network to avoid packet collisions. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for performing medium access control in a wireless network to avoid packet collisions as described herein. The non-processor circuits may include, but are not limited to, a radio receiver, a radio transmitter, signal drivers, clock circuits, power source circuits, and user input devices. As such, these functions may be interpreted as steps of a method for performing medium access control in a wireless network to avoid packet collisions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for performing medium access control to avoid collisions of packets being transmitted by nodes in a wireless network. The system and method perform the operations of prepending a header to a packet, such that the header is transmitted at a first processing gain (e.g. a first data rate) while the payload of the packet is transmitted at a second processing gain (e.g., a second data rate), such that the first processing gain is greater than the second processing gain. The system and method can select the second data rate based on an estimation of the interference at another node. The system and method according to the present invention further operate to avoid collisions between packets in wireless network calls by controlling, for example, the transmission of a first packet by a first node to a second node when transmission of a second packet from a third node to the second node occurs during transmission of the first packet, to avoid or at least minimize destructive interference.

FIG. 1 is a block diagram illustrating an example of an ad-hoc packet-switched wireless communications network 100 suitable for application of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes."

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, incorporated by reference herein, and in U.S. patent application Ser. No. 09/897,790, and U.S. Pat. Nos. 6,807,165 and 6,873,839, referenced above.

Figure 2:
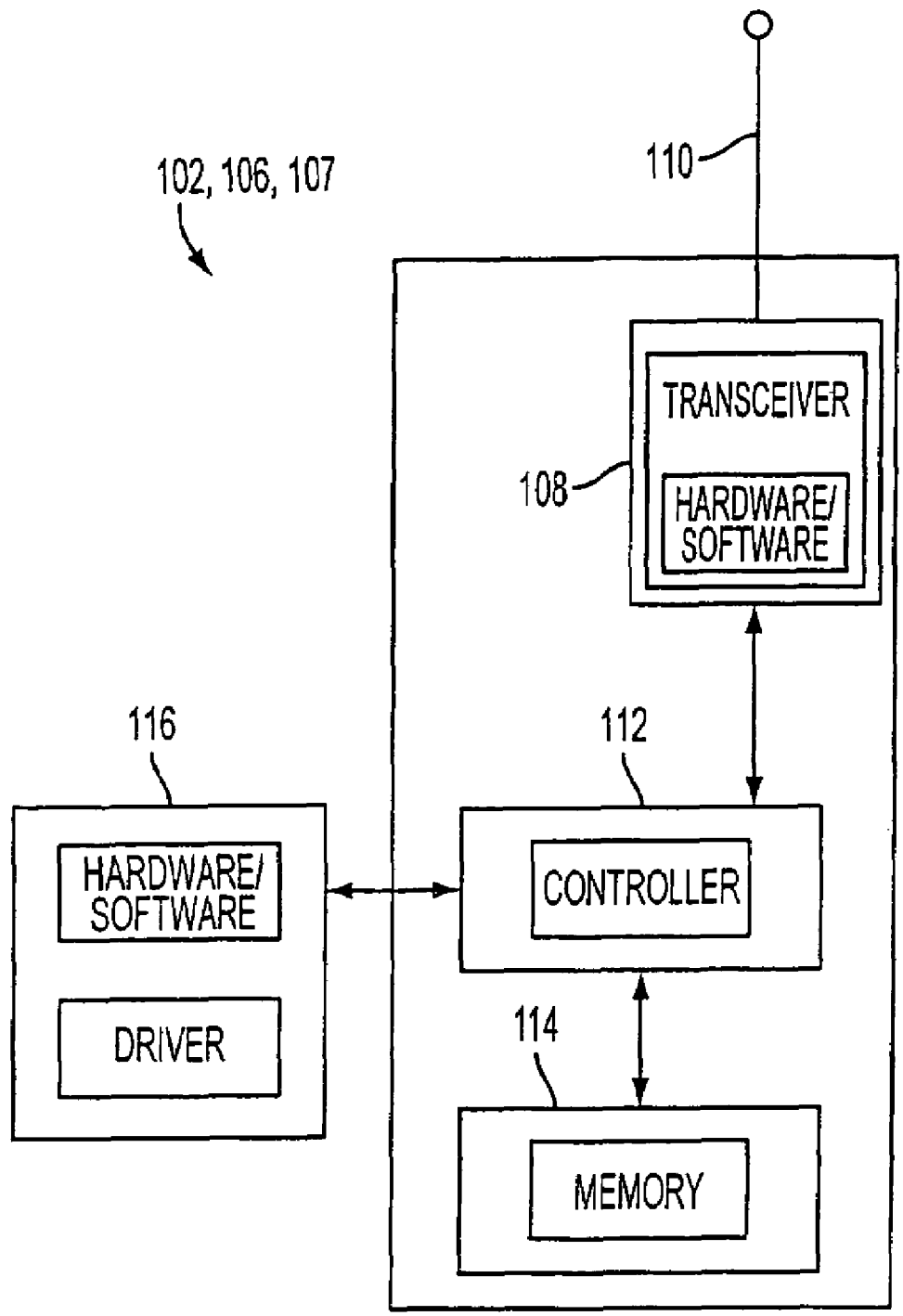
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be described, the medium access control (MAC) performed in accordance with some embodiments of the present invention described herein reduces collisions from occurring due to hidden nodes by prepending a high processing gain header to a packet being transmitted, such as a data packet. The structure of this high processing gain header allows the header to be decoded by the nodes that are likely to interfere with the reception of the packet. The extra range that is provided by the extra processing gain prevents the data packet from being received with an unacceptable signal-to-interference ratio.

The medium access protocol, according to another aspect of the present invention, is particularly useful in a single channel system where bandwidth utilization should be maximized. This medium access protocol also helps resolve the exposed node problem in an ad-hoc multihopping wireless network, such as the network 100 shown in FIG. 7. The protocol utilizes path loss information collected via regular neighbor/routing advertisements between nodes. This information is used to elect whether new transmissions are possible in the channel by computing the estimated interference, thus facilitating the maximization of channel utilization without additional signaling overhead.

As can be appreciated by one skilled in the art, the most common solution to avoid collisions caused by hidden nodes in a wireless network is through the use of a Carrier Sense Multiple Access/Collision Avoidance (CSMA/CA) protocol that performs an RTS/CTS (Request-to-Send/Clear-to-Send)

handshake. However, this solution is sub-optimal because of the considerable amount of overhead required to perform the handshake. Furthermore, RTS/CTS messages may also be subject to collisions, further slowing down the communication process. Also, most CSMA-type medium access controllers (MACs) prevent traffic from being transmitted by a node if a transmission has been scheduled or if a transmission is being sensed in the channel. In certain situations, the MAC underutilizes the channel's actual capacity, and it is sometimes possible to transmit even if another communication takes place as the same time because digital waveforms are resilient to certain amounts of interference. Also, MACs typically do not compare the amount of interference in the channel with the amount of interference that they are able to sustain.

The use of the high processing packet header in accordance with the present invention maximizes the range of the "informative transmission" relative to the "data transmission." For purposes of this description, "informative transmission range" refers to the area in which other units are made aware of the ongoing transmission; and "data transmission range" refers to the area in which the receiving unit is able to successfully decode the incoming data. It should be noted that when a traditional RTS/CTS exchange is used, the "informative transmission range" is larger than the "data transmission range" because of the resilient nature of the control packets. Conventional approaches have focused on matching both ranges to avoid unnecessary bandwidth reservation.

The following description refers in some instances to "nodes 102" for exemplary purposes. However, it should be noted that the term "nodes" can refer to any of the types of nodes 102, 106 or 107 as described above.

A practical way to increase the informative transmission range is to increase the processing gain of the informative transmission data in the packet. A transmitted packet includes a header and a payload. The header generally contains a small amount of data relative to the packet and the payload, such as the address of the source and destination, a unicast/broadcast bit (i.e., type of transmission), the data rate and the packet length. The processing gain may be increased by redundantly encoding information. For example, as appreciated by one skilled in the art, because the smallest element of data in an encoded signal is a "chip" which can be represented by, for example, phase changes in a phase encoded packet, multiple chips can be used to encode each bit of the header information. Although the use of multiple chips can slow the data rate, the multiple chips increase the processing gain and the transmission range for the header information.

The increased range provided by the increased processing gain permits more distant devices to receive and process the header information, including distant nodes (e.g., nodes 102, 106 or 107) that are traditionally referred to as the "hidden nodes". As understood in the art, a hidden node is a node that can transmit to a node within another node's range, but is itself out of range of that other node. For example, referring to FIG. 1, assuming that nodes 102-2 and 102-3 are within broadcast range of node 102-1 and node 102-6 is out of range of node 102-1 but nodes 102-2 and 102-3 are within broadcast range of node 102-6, then node 102-6 is a hidden node with respect to node 102-1. That is, if node 102-6 is sending packets to, for example, node 102-2, node 102-1 will be unaware of the sent packets and may also send packets to node 102-2, in which event those packets may collide with the packets being sent by node 102-6. This is commonly referred to as the "hidden node problem".

However, in accordance with the technique performed by the embodiments of the present invention, these more distant "hidden nodes" 102, 106 or 107 are able to successfully decode the information in the higher processing gain header of the packet, which thus notifies these nodes 102, 106 or 107 that a transmission is in progress. The data rate for the payload portion of the packet may be increased through the inclusion of a data rate field indicating a higher data rate for the payload portion. Due to the relatively small size of the header information relative to the payload, the additional time for transmitting the header at a slower data rate does not significantly increase the transmission time for the packet.

While all nodes 102, 106 or 107 within the information transmission range will receive and decode the higher processing gain header, only the recipient node will decode the payload of the packet. The other units not corresponding to the destination address will return to passive monitoring of the channel. It should be noted that the recipient node 102, 106 or 107 is assumed to be within the data transmission range of the transmitting node or the transmitter would not have elected to transmit in the first place. This can be substantially achieved by proper handling of neighbor advertisement techniques, as described in a U.S. patent application of Avinash Joshi entitled "System and Method For Achieving Continuous Connectivity to an Access Point or Gateway in a Wireless Network Following an On-demand Routing Protocol and to Perform Smooth Handoff or Mobile Terminals between Fixed Terminals in the Network", Ser. No. 10/755, 346, filed Jan. 13, 2004, and data rate selection techniques, as described in an application of Guenael T. Strutt and Sebnem Ozer entitled "System and Method for Adaptive Rate Selection for Wireless Networks", U.S. patent application Ser. No. 11/166,578 filed Jun. 24, 2005, both incorporated herein by reference in their entirety.

The informative transmission range and the data transmission range which are associated with every possible data rate may be selected so that the informative transmission range matches the "destructive collision range" exactly, or as precisely as possible or practical. The informative range may also be selected so that it extends beyond the "destructive collision range," to provide some margin of operation for obstruction or obstacles in the RF environment. Example of the destructive collision range is illustrated in the following FIGS. 3 and 4. In both of FIGS. 3 and 4, the header is identical, that is, the range of the header (i.e., the informative data range) of a packet transmitted from node 102-1 (designated as node A) that reaches node 102-3 (designated as node C) is the same, as illustrated by the outer circle 150. The difference between the transmissions lies in the data transmission range of the payload from node A.

As can be appreciated from the following description, in FIGS. 3-7 and 11, dashed lined circles correspond to the "control radius", "informative radius" or "informative data range" (i.e., the maximum distance at which knowledge of a communication is possible by another node in the wireless network 100) of the respective nodes that the circles surround. These exemplary radii are constant or generally constant. A solid lined circle corresponds to the "packet radius" or "capture radius" of the node (e.g., nodes A through D) which the circle surrounds, thus indicating the maximum distance at which the communication is possible with another node, which depends on the selected data rate for transmission. The shaded areas correspond to the "interference radius" or "destructive collision range", that is, the maximum distance at which another node will adversely affect the scheduled transmission of a node, which also depends on the selected data rate. In other words, in this example, the interference radius (destructive collision range) indicates that destructive collision (and thus packet loss) is possible between packets being transmitted from node A to node B and packets transmitted by another node if that other node is within the destructive collision range.

Figure 3:
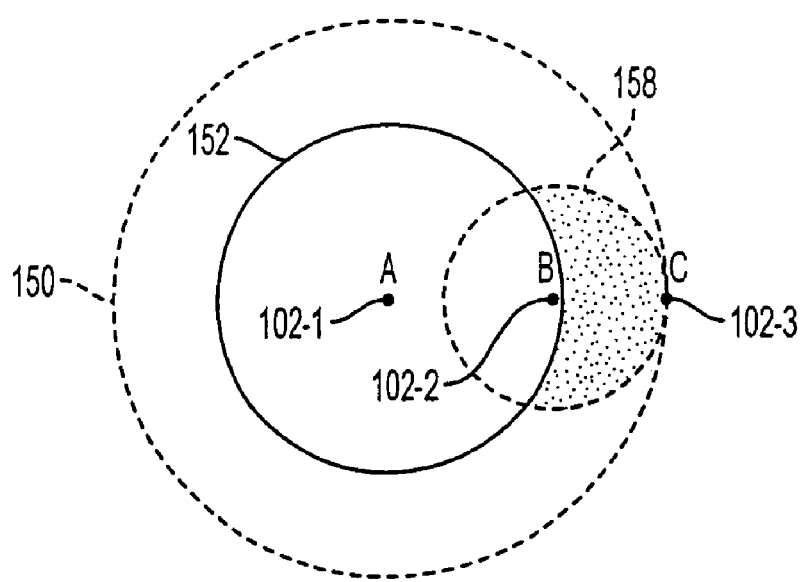
FIG. 3 is a wireless node diagram illustrating effective transmitting ranges in an example of a hidden wireless node problem for nodes such as the nodes employed in the network shown in FIG. 1 in accordance with the present invention.

When the processing gain for the payload (data) transmission by node A is higher, then the transmission range (packet radius) is larger, as illustrated by the inner circle 152 in FIG. 3, and the "destructive collision range" around the receiver node 102-2 (designated as node B) is smaller, as illustrated by the shaded area of FIG. 3. The interference radius around node B (102-2) as indicated by circle 158 is larger in FIG. 4 than in FIG. 3, because the data rate of the packet transmission from node A (102-1) is higher. To compensate for the increased interference range, it is still preferable to have a large informative range 150 of node A that can still reach node C (102-3).

Figure 4:
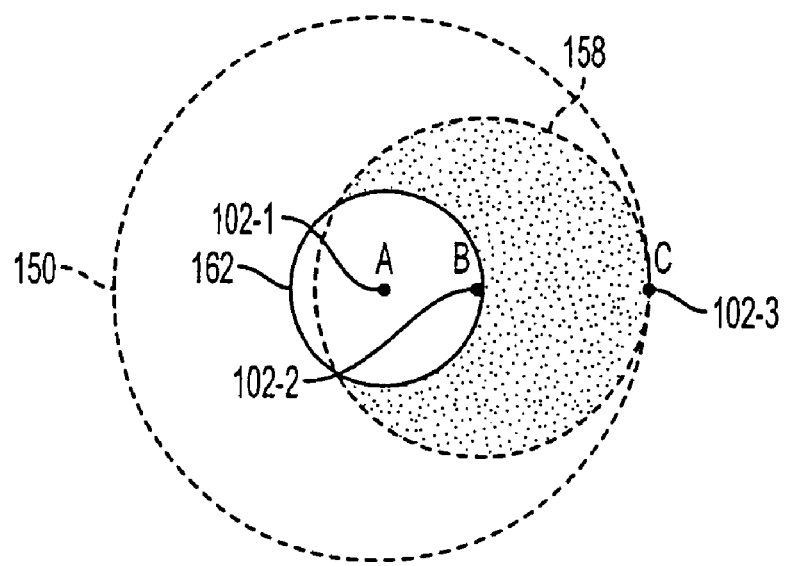
FIG. 4 is a wireless node diagram illustrating effective transmitting ranges in an example of a hidden wireless node problem for nodes such as the nodes employed in the network shown in FIG. 1 in accordance with the present invention.

Also, when the processing gain of the payload is lower, as illustrated by the smaller circle 162 in FIG. 4, then the transmission range is smaller and the destructive collision range becomes larger, which is illustrated by the shaded area in FIG. 4. The interference radius of node B is this example as indicated by circle 158 is larger. This example illustrates that the larger informative data range 150 of node A permits a lower payload transmission range 162 to be used by node A while also reducing destructive collisions with node B, which permits more effective use of the channel. By carefully matching the processing gain of the header, it is possible to create a network in which the hidden node problem is reduced or perhaps eliminated, except for shadowing effects and the presence of obstacles as discussed below. It should be noted that in addition to increasing the processing gain of the header, it is also possible to increase the transmission range 150 by increasing the coding gain by changing the forward error correction (FEC) scheme.

It should also be noted that additional transmission time and increased processing gain is used to obtain the larger "informative range" for the header prepended to the packet and transmitted at a lower data rate. However, this trade-off is largely compensated by the ability to forego a CTS message and its associated overhead. Accordingly, the techniques described above reduce the overhead involved to perform virtual carrier sensing with an RTS/CTS handshake as known in the art, and also effectively disseminate information about channel usage to other nodes 102, 106 and 107, so that they can more efficiently use the channel.

Another aspect of the present invention relates to interference estimation. The proposed MAC is able to increase capacity in the network 100 by performing the task of dissemination and collection of path loss statistics. For example, in an ad-hoc multihopping network 100 using a distance vector routing protocol, routing advertisements are exchanged frequently to keep up-to-date information about the network. Typically these advertisements consist of a header and routing entries for different destinations. These entries contain the destination address and cost metric to reach the destination address. This cost metric is typically equal to the number of hops but can be a function of various factors, such as number of hops, data rate, latency, congestion and power. Nodes 102, 106 and 107 advertise the number of hops and path loss, among other relevant metrics, but the path loss is typically sent only for neighboring nodes, that is, typically only the routing entries having a value of "1" as the hop metric will include a path loss value. The path loss is calculated by passive measurements done on the various messages exchanged with the neighboring node as can be appreciated by one skilled in the art. These messages can be RTS, CTS, Routing Advertisement, Neighbor Advertisements or unicast data messages. Similarly, if the network 100 is following a Link State Routing Protocol as understood in the art, the path loss information for neighbors can be sent along with the regular link updates. On the other hand, if the network 100 is not using an On-Demand Routing Algorithm, then the nodes 102, 106 and 107 send a periodic message which contains a list of neighboring node addresses along with the path loss associated with them.

The embodiments of the present invention thus are capable of evaluating the interference as will now be described. That is, when the Medium Access Controller, which can be included in the controller 112 as shown in FIG. 2, receives a packet from the application layer, the Medium Access Controller determines whether a particular channel is available. The availability is typically checked by virtually sensing the medium. In a typical implementation, the potential transmitting node (e.g., node C in FIG. 5) may have known about an ongoing or forthcoming transmission in its vicinity, which thus prevents node C from initiating a valid transmission to another node (e.g., node 102-4 designated as node D). The knowledge of an ongoing or forthcoming transmission in the vicinity of the node can be achieved by direct carrier sensing, or upon receiving an RTS or CTS message in a CSMA/CA protocol. When node C elects not to transmit, node C typically enters a random back-off mode where the transceiver 108 (see FIG. 2) of node C will wait for a period of time longer than the time required for the current transmission time to end.

The problem associated with the absence of communication in the vicinity of an initiated transmission is commonly referred to as the "exposed node" problem. This problem can be overcome by estimating the amount of interference that would be created if the packet was actually sent. This estimation is made possible, for example, by the path loss data that is collected, the transmission power, and by accurate knowledge of the Multiple Access Interference characteristics of the receivers of the nodes 102, 106 or 107 in the vicinity.

The first interference estimation that is performed relates to the current/scheduled transmission. In the examples of FIGS. 5-7 and 11, the informative radius of node A is indicated by circle 150, and the informative radius of node C is indicated by circle 170. The packet radius of node A is indicated by circle 152, the interference radius of node B is indicated by circle 158, the packet radius of node C is indicated by circle 172, and the interference radius of node D is indicated by circle 180.

Figure 5:
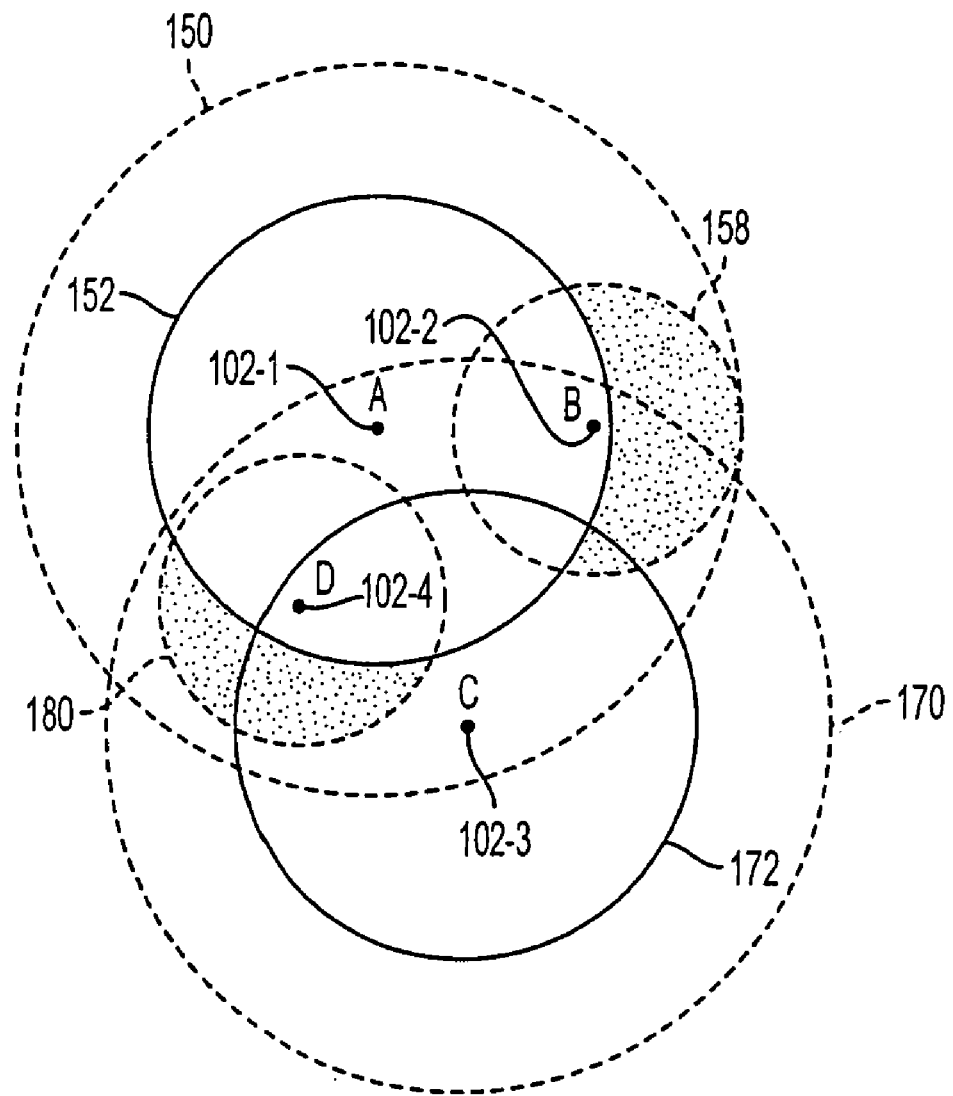
FIG. 5 is a wireless node diagram illustrating effective transmitting ranges in an example wherein two different pairs of adjacent wireless nodes, such as the nodes employed in the network shown in FIG. 1, may communicate without collision where the processing gain of a transmitting node in selected in accordance with the present invention.

In this example of FIG. 5, node A transmits to node B or has scheduled to transmit to node B. Node C estimates whether a transmission to node D will adversely affect the probability of success associated with node B receiving a packet from node A. To perform this estimate, node C should know the transmit power of node A, the path loss between nodes A and B, the path loss between nodes C and B, and the data rate used by nodes A and B. The information about the data rate is important because the information indicates how resilient node B is to Multiple Access Interference. Typically, an increase in data rate results in the loss of processing gain and sensitivity.

Figure 6:
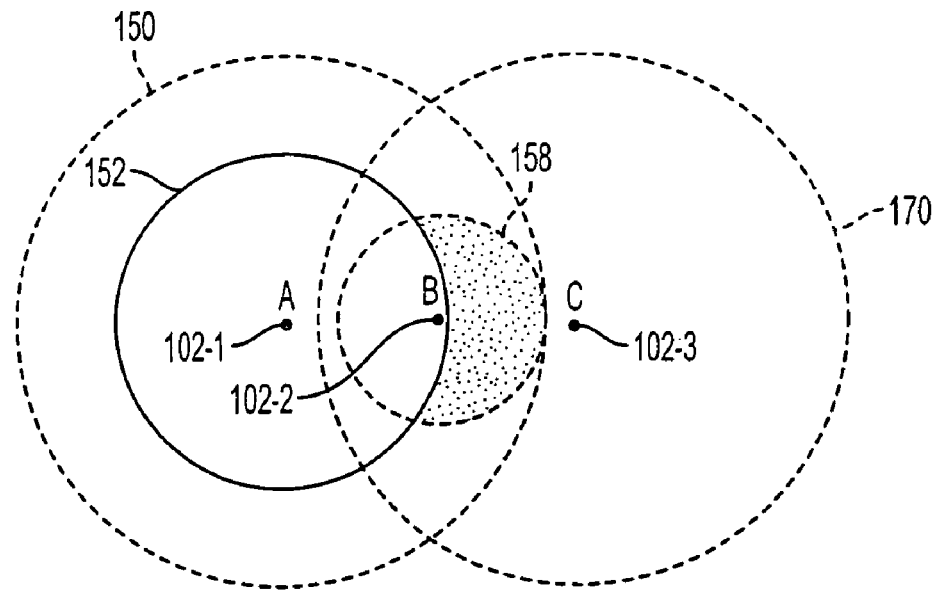
FIG. 6 is a wireless node diagram illustrating effective transmitting ranges in another example of a hidden wireless node problem for nodes such as the nodes employed in the network shown in FIG. 1, where one node has no knowledge of the transmission of another node's transmission.
Figure 7:
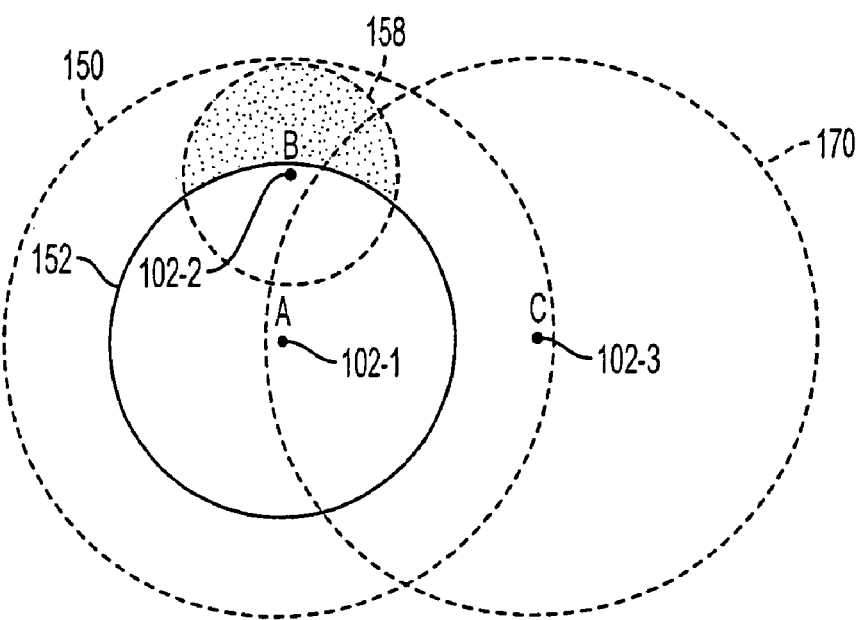
FIG. 7 is a wireless node diagram illustrating effective transmitting ranges in an example of an exposed node problem for nodes such as the nodes employed in the network shown in FIG. 1, where one node has no knowledge of another node's position within the network.

FIGS. 6 and 7 illustrate examples of how design of the control and packet radii according to the present invention can resolve issues related to the absence of information about neighboring transmissions. In the hidden node example of FIG. 6, even if node C has no knowledge of node A's transmission, node C cannot interfere with node B because node C is outside of the destructive interference radius (the shaded area) of node B. In the exposed node example shown in FIG. 7, node C has no knowledge of node B's position. In this example, node A can transmit to node B without concern for interference from node C. Node C would detect node A's transmission because node C is within control radius 150 and evaluate whether it could begin a transmission to another node without interfering with node B's reception. Node B is outside of Node C's control radius 170.

As can be appreciated by one skilled in the art, path loss information may be gathered through advertisements or updates (as previously described), and proper design and selection of packet capture radii. If node B is outside of node C's packet radius 170 (because it is also outside of node C's control radius which is larger than the packet radius), as is the case in the example shown in FIG. 7, then due to the packet radius design as discussed above, node C cannot interfere with node B. In essence, the packet radius should be greater (or equal) to the maximum distance at which there is a possibility of interference. In other words, the packet radius 170 of node C is selected such that node D is within the packet radius 170, but node B is outside of node C's packet radius. It should also be noted that because node B is still within node C's control radius, transmission of the prepended header may still interfere with node A's transmission to node B. To avoid a destructive collision, node A provides information in the header which can be received by node C, and node C will refrain from transmitting based on that information.

It should further be nodded that that if a node (e.g., node C) attempting to transmit is outside of the range of the header of a transmitting node (e.g., node A), then the transmission of node C cannot destructively collide with the transmission by node A. If packet loss does occur, this typically means that there is an obstruction (e.g., a building or other object) between the transmitting node (node A) and the node attempting to transmit (node C). The advantages obtained by limiting the overhead using the high processing gain header as discussed above beneficially outweighs those circumstances where some amount of retries between nodes is unavoidable, such as in urban or domestic deployment environments.

Figure 8:
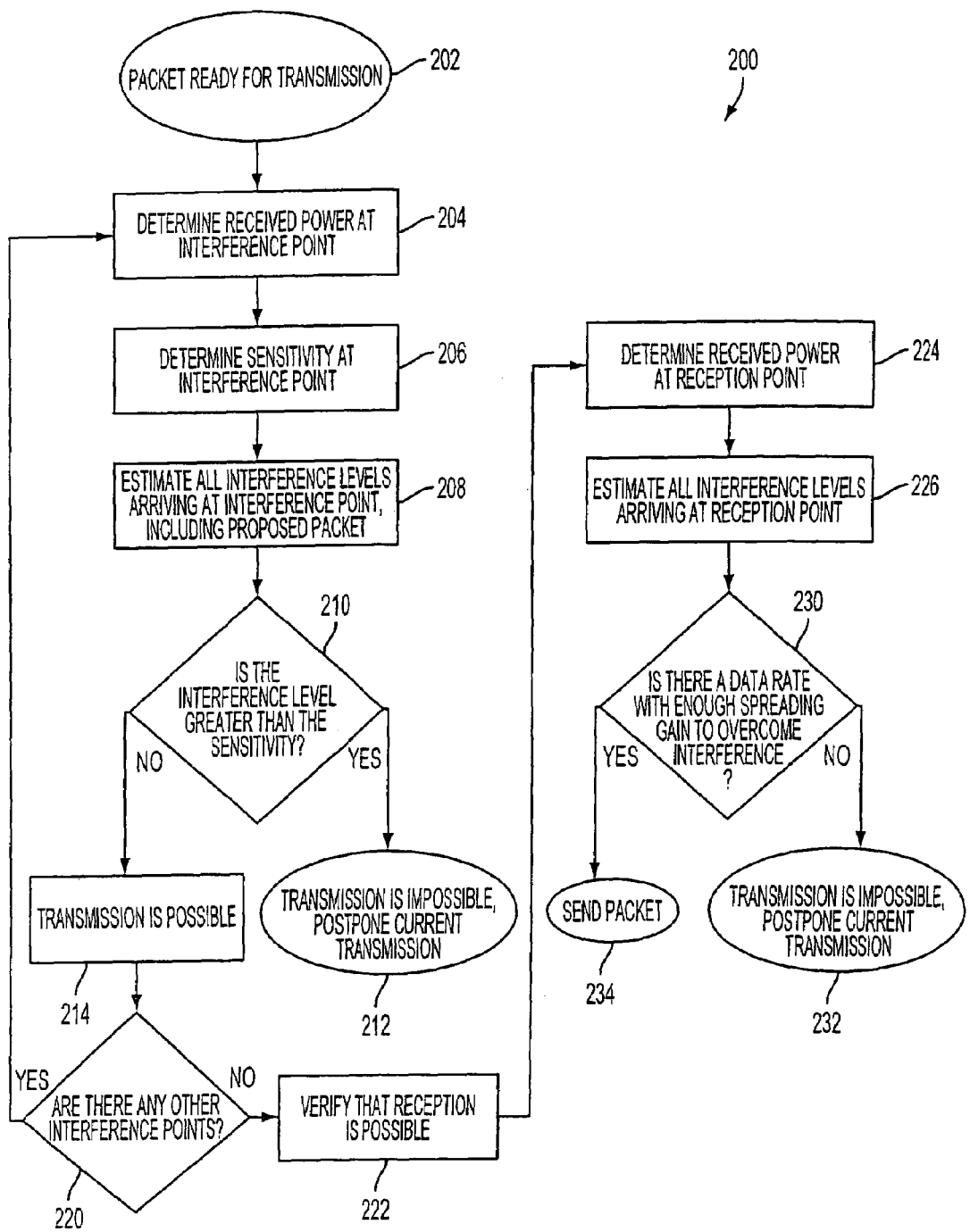
FIG. 8 is control flow diagram illustrating an embodiment of an algorithm for estimating interference that will be caused by a wireless node transmitting into a wireless network.

FIG. 8 is a control flow diagram illustrating a process 200 according to an embodiment of the present invention that enables a node 102, 106 or 107 which has a packet ready for transmission to estimate potential interference with that transmission. In process 200, the path loss information together with the transmit power and the data rate can be used to determine whether a new transmission can be initiated. In step 202, a packet is ready for transmission. The received power at an interference point (e.g., a node in the vicinity of the receiving node with which the transmission can interfere) is determined in step 204 and the sensitivity at the interference point is determined in step 206, and in step 208, an estimate is made of all interference levels of packets arriving at the interference point, including the packet proposed for transmission. It should be noted that the same procedure can be used when there are already several scheduled transmissions.

When the interference level is determined in step 210 to be greater than the sensitivity at the interference point, the processing continues to step 212, where the transmitting node postpones transmission because transmission of the packet is not currently possible (e.g., the level of interference is too large). Otherwise, transmission is possible and the processing continues to step 214 for further consideration regarding transmission of the packet. That is, the node 102, 106 or 107 attempting to transmit the packet (the transmitting node) determines in step 220 if there are any additional interference points (e.g., other nodes in the vicinity of the receiving node with which the transmission can interfere) and if so, repeats the process discussed above for each of those interference points and the interference levels are accumulated (e.g., added together).

Once all of the interference points have been evaluated, the processing continues by determining the probability the packet scheduled for transmission can be successfully received at the destination node 102, 106 or 107. The difference in the manner in which the interference created by the scheduled packet on other nodes 102, 106 or 107 is estimated and the interference imposed upon the scheduled packet at the receiving node 102, 106 or 107 by other nodes 102, 106 or 107 is estimated is that there is only one packet transmission (i.e., the scheduled packet) to be considered, and there is no data rate (or spreading code) associated with that packet at that time. Thus, the transmitting node 102, 106 or 107 has the opportunity to select the best data rate associated with a successful transmission, based on the estimated interference. This data rate selection can be used in conjunction with any built-in data rate selection mechanism and typically the most conservative estimation may be used for transmission as can be appreciated by one skilled in the art.

Once the transmitting node 102, 106 or 107 verifies that reception is possible in step 222, the received power at the receiving node 102, 106 or 107 is determined in step 224, and an estimate is made of all interference levels or packets arriving at the receiving node 102, 106 or 107 in step 226. The receiving node 102, 106 or 107 can send this information to the transmitting node 102, 106 or 107 via any type of message as can be appreciated by one skilled in the art. When the transmitting node 102, 106 or 107 determines in step 230 that a data rate is available with enough spreading gain to overcome the interference, then the packet may be sent in step 234. However, when transmission is not possible, the transmitting node 102, 106 or 107 postpones its current transmission in step 232.

Figure 9:
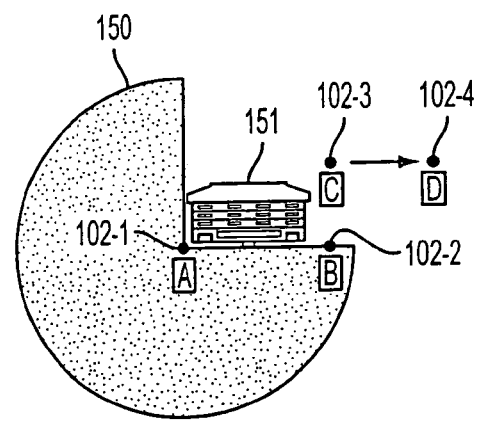
FIG. 9 is a wireless node diagram illustrating effective transmitting ranges in an example of a shadowed wireless node problem for nodes such as the nodes employed in the network shown in FIG. 1, where one node is shadowed from the transmission of another node such that it has no knowledge of the other node's transmission within the network.

As can be appreciated by one skilled in the art, even using the approach described above, it is possible to encounter situations where a node 102, 106 or 107 will not be able to detect another transmission, which results in a collision. FIG. 9 illustrates one example where node C is shadowed from the transmission of node A by a building 151. Hence, even using the added capture range indicated by circle 150, node C is unable to receive node A's RTS-like header. Therefore, node C is unaware of the impending transmission from node A, and in this situation, it is possible that communication with node C may be adversely affected by the transmission by node A. This situation can be prevented from occurring by ensuring that there is enough tolerance in the relative sensitivities of the header and the overall packet, and by the backoff mechanism described below.

Figure 10:
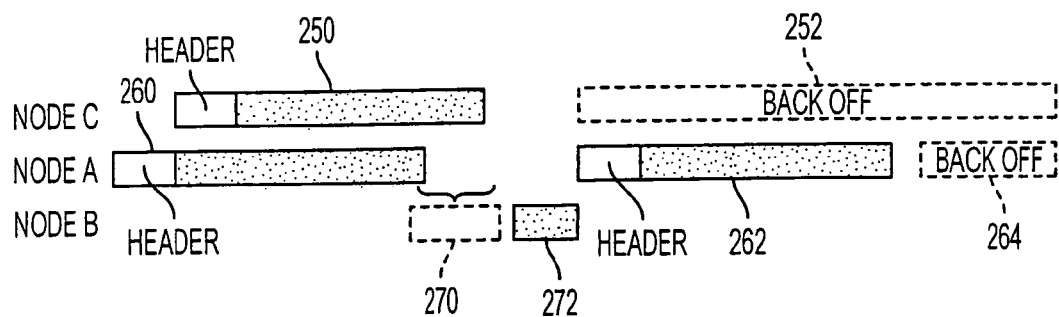
FIG. 10 is a packet transmission diagram illustrating an example of transmissions between the nodes of FIG. 9 to address a possible collision due to the shadowing problem shown in FIG. 9 in accordance with another aspect of the present invention.

FIG. 10 illustrates an example of another aspect of the present invention in which a potential destructive packet collision due, for example, to the situation encountered in FIG. 9, is handled by a procedure utilizing a NACK (non-acknowledgement) message. As shown in FIG. 10, node A begins transmitting packet 260, which node C is unable to detect. This can result in node C beginning to transmit packet 250 resulting in a collision at node B. If we assume that the transmission of packet 260 to node B fails, then node B sends a NACK message 272 to node A. This NACK message 272 would cause node A to enter a random backoff mode, such as those that would occur in slotted and unslotted ALOHA MAC protocols. That is, as understood in the art, in an ALOHA protocol, the transmitting node awaits authorization from the receiving node before transmitting the packet.

According to the present invention, it is assumed, however, that it is unfair to node A to cause node A to enter the random backoff mode unless the other transmitting node (node C) enters the same mode. To do this, node B performs carrier sensing 270 of the medium after the end of transmission of packet 260 by node A in order to detect the end of transmission of packet 250 by node C. Once node C ceases transmitting packet 250, node B sends the NACK message 272 to inform node C of the fact that a recent reception of a neighbor (node A) failed immediately after node C transmitted a packet. Node C therefore enters a random backoff mode as did node A. The NACK informs node C that the failed packet 260 from node A will be retransmitted with a higher priority, resulting in retransmission of packet 260 by node A as packet 262 without waiting for a full backoff period. Node A then enters a backoff period 264 to allow node C to transmit. It should be noted that the NACK is broadcast to all neighboring nodes of node B. Therefore, no neighbor node is aware that they are responsible for colliding with packet 260, so they all back-off to allow for a retry. This approach to broadcasting NACKs to all neighbors leads to having the neighbor nodes release some of their bandwidth, thus ensuring a functionality similar to that provided by a CSMA/CA or ALOHA protocol with the advantage of a reduced overhead and increasing spectral reuse.

Figure 11:
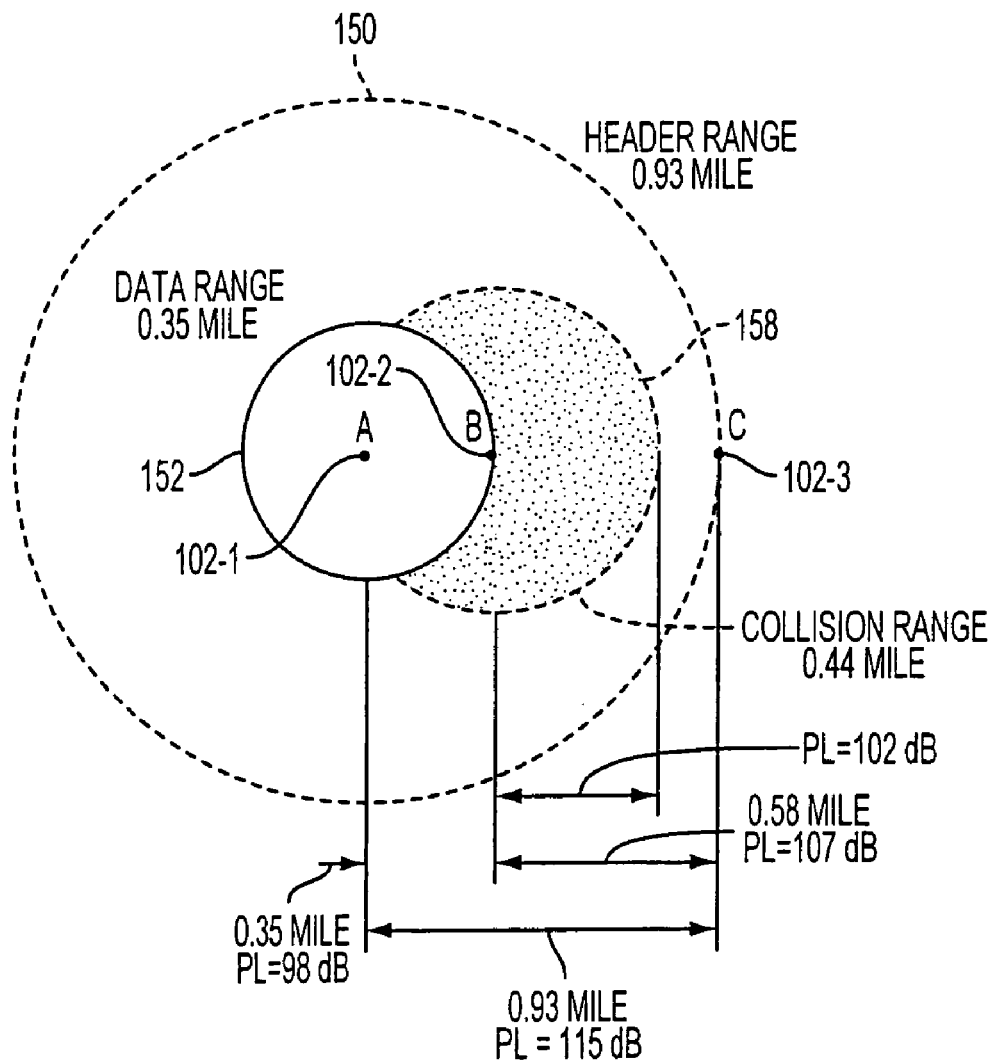
FIG. 11 is a wireless node diagram illustrating an example of ranges for nodes, such as the nodes employed in the network shown in FIG. 1, using a system and method according to an embodiment of the present invention.

FIG. 11 is another example demonstrating the use of medium access control (MAC) according to an embodiment of the present invention in a network, such as a network complying with the International Electrical and Electronics (IEEE) Standards 802.11a or 802.11g. In this example, the nodes 102, 106 and 107 transmit a thirty-two (32) chips per symbol binary phase shift keying (BPSK) encoded waveform for their transmitted packet header and an 8 chips per symbol quadrature phase shift keying (QPSK) ½ rate encoded waveform for the data (payload) portion of the transmitted packet. As shown, the exemplary range of the uncoded header at 1 megabit per second (Mbps) 0.93 miles based on a standard propagation model which, as can be appreciated by one skilled in the art, is represented as $PL=40+20\log(f_{c\,(MHz)})+40\log(d_{(km)})$, where PL is the power level, $f_c$ represents the frequency of the transmitted signal in megahertz (MHz), and d represents the distance in kilometers (km). The sensitivity is the measured sensitivity of the node 102, 106 or 107 (e.g., the sensitivity of the transceiver 108 of the node). The minimum signal to interference ratio (SIR) that the transceiver 108 can operate under is also a measured value. In this example, the maximum range of a ½-rate coded data packet of length 1450 bytes at 4 Mbps with QPSK modulation is 0.35 miles. This leaves a margin of 0.58 miles for the propagation and successful reception of the header. Knowing that an SIR of 4 dB is maintained at a distance of 0.44 miles, it can be appreciated by one skilled in the art that for an omnidirectional propagation scenario, the CTS serves no purpose. For non-omnidirectional propagation situations, such as the shadowing problem illustrated in FIG. 9, the NACK is used to replicate the features of a CTS.

It can further be appreciated by one skilled in the art that variations to the above embodiments are possible. For example, the techniques and process discussed above can be employed with any suitable MAC protocol. The use of a NACK message to cause a transmitting node to enter a random back-off mode can be applied to any handshake-free MAC such as ALOHA, and can be used with CSMA/CA protocols as well.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for communicating in a wireless network, the method comprising:

operating a node in the wireless network to provide a packet for transmission, such that a header of the packet is provided for transmission at a first processing gain and a payload of the packet is provided for transmission at a second processing gain lower than the first processing gain; and further comprising:

operating the node to select the first and second processing gains based on another node in the network, such that the first processing gain is sufficient to enable said another node to receive and process information in the packet header, or the second processing gain is high enough so that a destination node to which information in the payload is addressed is able to receive and process the information in the payload in the event that the another node is unable to receive and process the information in the packet header.

2. The method as claimed in claim 1, wherein:

the first processing gain comprises a first data rate and the second processing gain comprises a second data rate lower than the first data rate.

3. The method of claim 1, wherein:

the selecting step comprises operating the node to estimate interference at said another node due to the packet transmission, and to select the second processing gain based on the estimated interference.

4. The method of claim 1, further comprising:

operating said another node to control its transmission of a second packet based on the information in the packet header received when the packet is transmitted.

5. The method of claim 4, wherein said another node operating step further comprises:

operating said another node to estimate interference due to transmission of the second packet, and to transmit or refrain from transmitting the second packet based on the estimated interference.

6. The method of claim 1, further comprising:

operating the node to determine whether to transmit the packet based on an estimate of interference at other nodes in the network due to the packet transmission.

7. The method of claim 6, further comprising:

operating the node to determine whether to transmit the packet based on an estimate of interference at a receiving node for which the packet is intended.

8. The method of claim 7, further comprising:

operating the node to transmit the packet when the estimates of the interferences at the other nodes and at the receiving node are at acceptable levels.

9. A wireless communication network, comprising:

a first node, adapted to provide a packet for transmission, such that a header of the packet is provided for transmission at a first processing gain and a payload of the packet is provided for transmission at a second processing gain lower than the first processing gain; and further comprising:

at least one other node, adapted for communication in the network; and wherein the first node is further adapted to select the first and second processing gains based on said other node in the network, such that the first processing gain is sufficient to enable said other node to receive and process information in the packet header, or the second processing gain is high enough so that a destination node to which information in the payload is addressed is able to receive and process the information in the payload in the event that the another node is unable to receive and process the information in the packet header.

10. The wireless communication network as claimed in claim 9, wherein:
the first processing gain comprises a first data rate and the second processing gain comprises a second data rate lower than the first data rate.

11. The wireless communication network of claim 9, wherein:
the node is further adapted to estimate interference at said other node due to the packet transmission, and to select the second processing gain based on the estimated interference.

12. The wireless communication network of claim 9, further comprising:
operating the other node to control its transmission of a second packet based on the information in the packet header received when the packet is transmitted.

13. The wireless communication network of claim 12, wherein:
the other node is further adapted to estimate interference due to transmission of the second packet, and to transmit or refrain from transmitting the second packet based on the estimated interference.

14. The wireless communication network of claim 9, wherein:
the node is further adapted to determine whether to transmit the packet based on an estimate of interference at other nodes in the network due to the packet transmission.

15. The wireless communication network of claim 14, wherein:
the node is further adapted to determine whether to transmit the packet based on an estimate of interference at a receiving node for which the packet is intended.

16. The wireless communication network of claim 15, further comprising:
the node is further adapted to transmit the packet when the estimates of the interferences at the other nodes and at the receiving node are at acceptable levels.

* * * * *